United States Patent Office.

PETER J. KELLY, OF NEW YORK, N. Y.

Letters Patent No. 109,018, dated November 8, 1870.

IMPROVEMENT IN COMPOSITIONS FOR COATING BEARINGS.

The Schedule referred to in these Letters Patent and making part of the same.

*To all whom it may concern:*

Be it known that I, PETER J. KELLY, of the city, county, and State of New York, have invented a new and improved Composition for Coating Bearings, &c.; and I do hereby declare that the following is a full, clear, and exact description thereof, which will enable others skilled in the art to make and use the same.

This invention relates to a new compound for covering soft material, such as leather, paper, &c., as well as metallic surfaces, so as to prepare the same for bearings, bolsters, or steps for shafting and axles of suitable kind.

The compound is metallic, and serves to utilize fibrous substances for bearings, and to cause a reduction of friction on account of its porosity, softness, and smoothness. The porous ingredients serve to make it to a certain extent elastic.

My improved composition consists of plumbago, or its metallic equivalent, fine iron filings, and a small portion of asbestos, mixed with fixed oil.

The surface to be covered is first coated and saturated with diluted acid, sulphuric being the base. After such coating of the bearing-surface I apply the aforesaid mixture and subject the whole to a high temperature.

When the mixture has become hardened I cover the surface with whiting, for the purpose of neutralizing the effects of acid, when the coating becomes perfectly neutral.

I apply, by measure, one part of plumbago to two parts of asbestos, mix both with lard-oil to form a paste, and then put in the paper.

I now apply a temperature of about 150° Fahrenheit for six hours, then take out of soak and press between plates heated to a temperature of 175°. I then season for three days.

This preparation is then mixed with iron filings and a solution of sulphuric acid, which partially oxidizes material on bottom of box and makes it adhere to the metal.

It is then placed in a mold heated to a temperature of 150°, where it undergoes heavy pressure.

It is lastly seasoned for three days in a temperature of from 100° to 150°, after which it is ready for use.

Having thus described my invention,

I claim as new and desire to secure by Letters Patent—

The herein-described composition for, and method of covering, bearing surfaces, as specified.

PETER J. KELLY.

Witnesses:
A. V. BRIESEN,
T. B. MOSHER.